United States Patent [19]

Tsubouchi

[11] Patent Number: 4,458,118
[45] Date of Patent: Jul. 3, 1984

[54] RESERVOIR WITH LIQUID LEVEL SENSING DEVICE

[75] Inventor: Kaoru Tsubouchi, Toyata, Japan
[73] Assignee: Aisin Seiki Kabushiki Kaisha, Kariya, Japan
[21] Appl. No.: 361,350
[22] Filed: Mar. 24, 1982

[30] Foreign Application Priority Data

Mar. 24, 1981 [JP] Japan .................. 56-42135[U]

[51] Int. Cl.³ .................................... H01H 35/18
[52] U.S. Cl. .................................... 200/84 C
[58] Field of Search ............. 200/84 R, 84 C, 81.9 M

[56] References Cited

U.S. PATENT DOCUMENTS

| | | | |
|---|---|---|---|
| 3,678,232 | 7/1972 | Hodges | 200/84 C |
| 3,680,044 | 7/1972 | Tsubouchi | 200/84 C X |
| 3,947,813 | 3/1976 | Uemura et al. | 200/84 C X |
| 4,037,193 | 7/1977 | Uemura et al. | 200/84 C X |
| 4,057,700 | 11/1977 | Nakashima | 200/84 C |

Primary Examiner—J. R. Scott
Attorney, Agent, or Firm—Oblon, Fisher, Spivak, McClelland & Maier

[57] ABSTRACT

A reservoir is disclosed which has a tank made of synthetic resin and incorporated a liquid level sensing device whereby the sensing device has a magnetically actuable switch enclosed in a depending hollow tubular portion of the tank and a float having a magnet which is axially slidable on the tubular portion in order to actuate the switch when the magnet and the switch are in proximity with the tank having both upper and lower shells with the upper shell being formed integrally with the hollow tubular portion and one of the shells being formed integrally with a heat shielding skirt portion which surrounds the tubular portion. The heat shielding portion extends into the interior of the lower shell for shielding the tubular portion against the welding heat during the connection of the upper and lower shells.

5 Claims, 2 Drawing Figures

RESERVOIR WITH LIQUID LEVEL SENSING DEVICE

BACKGROUND OF THE INVENTION

1. Field of the Invention

The present invention relates to reservoirs having liquid level sensing devices for indicating when the liquid level in the reservoir falls below a predetermined minimum. For example, the reservoir may be a hydraulic brake fluid reservoir for an automobile, and the sensing device may be electrically connected to a circuit for generating an alarm signal when the liquid level falls below the predetermined minimum due to leakage.

2. Description of the Prior Art

Many reservoirs having proximity sensors are known, in which a float member floating on the surface of the hydraulic fluid has a magnet which activates a proximity switch when the liquid level falls below a predeterined level. The proximity switch is conventionally enclosed within a hollow tubular member attached to an upper wall of the reservoir tank which comprises upper and lower shells made of synthetic resin. Such reservoir construction is advantageous because there is no damage due to heat welding in the connection of the upper and lower shells because the tubular member is attached to the tank after the heat welding has been performed. However, there is a disadvantage with regard to an increase in the manufacturing cost due to attaching the tubular member to the tank.

SUMMARY OF THE INVENTION

Accordingly, one object of this invention is to provide a novel and improved reservoir having a tank made of synthetic resin and incorporating a liquid level sensing device, wherein the sensing device comprises a magnetically actuable switch enclosed in a depending hollow tubular portion of the tank and a float member having a magnet axially slidable on the tubular portion for actuating the switch when the magnet and switch are in proximity. The tank has upper and lower shells with the upper shell formed integrally with the hollow tubular portion. Additionally, one of the shells is formed integrally with a heat shielding skirt portion surrounding the tubular portion and the float member. The heat shielding portion is extended into an interior of the other of the upper and lower shells for shielding the tubular portion against the welding heat during the connection of the upper and lower shells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
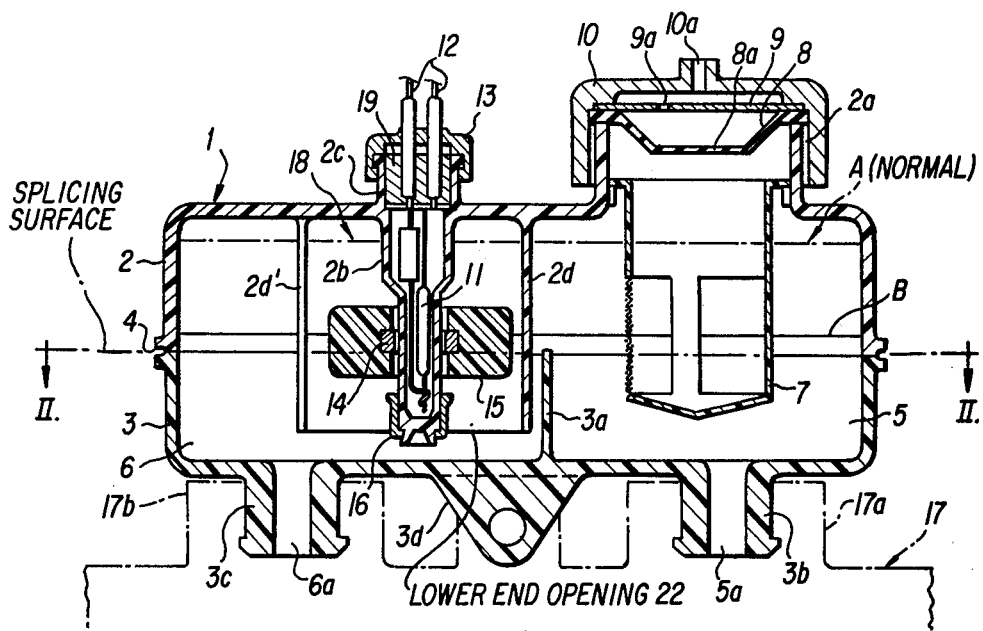
FIG. 1 thereof, is a longitudinal cross sectional view of an embodiment of a reservoir according to the present invention.
Figure 2:
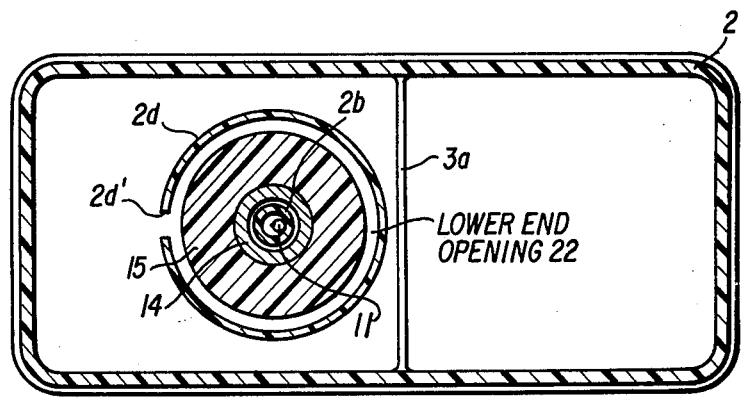
FIG. 2 is a cross sectional view taken along the line II—II of FIG. 1.

Referring now to the drawings, wherein like reference numerals designate identical or corresponding parts throughout the several views, and more particularly to a reservoir tank 1 comprising upper and lower shells 2 and 3 made of synthetic resin which are connected to each other at a portion 4 by heat welding.

The lower shell 3 has first and second tubular boss portions 3b and 3c which are inserted into first and second tubular boss portions 17a and 17b respectively of a tandem brake master cylinder 17. A projection 3d of the lower shell 3 is used to connect the tank 1 and master cylinder 17 by a pin, not shown. A projection wall 3a of the lower shell 3 is effective to separate an interior of the tank 1 into first and second brake fluid chambers 5 and 6 when the fluid in the tank 1 falls below a predetermined level. The chambers 5 and 6 are in normal fluid communication with two pressure generating chambers (not shown) in the master cylinder 17 through ports 5a and 6a, respectively.

The upper shell 2 has a hollow cylindrical portion 2a for forming a fluid filling opening. A strainer 7 is disposed within the tank 1. A cover 10 is in screwthreaded engagement with the portion 2a and is formed with an air-passage 10a. A circular diaphragm 8 and a circular plate 9 are interposed between the top of the portion 2a and cover 10. The plate 9 is formed with an air-passage 9a and the diaphragm 8 is formed with slit 8a for providing an air-passage when the diaphragm 8 deforms in response to the pressure variation in the tank.

According to the present invention, the upper shell 2 is formed integrally with a hollow tubular portion 2b for enclosing therein a proximity switch 11, such as a reed switch of a fluid level sensing device 18 in the chamber 6. The sensing device 18 has a float member 15 with a magnet 14 axially slidable on the tubular portion 2b for actuating the switch 11 when the fluid level in the tank 1 falls below a minimum shown at B in FIG. 1. The switch 11 is electrically connected to a circuit, not shown, for generating an alarm signal via lead wires 12 which are passed through a sealing member 19 in the hollow projection 2c of the shell 2 and cover 13 attached to the upper end of the projection 2c.

The upper shell 2 is further formed integrally with a cylindrical heat shielding skirt portion 2d surrounding the tubular portion 2b and the float 15. The heat shielding skirt portion 2d is extended into an interior of the lower shell 3 where it has a lower end opening 22 for shielding the tubular portion 2b against the welding heat. The heat shielding skirt portion 2d has a length which is substantially equal to a length of the tubular portion 2b. The heat shielding skirt portion 2d is formed with an air-passage for establishing fluid level correspondence between interior and exterior thereof. The air-passage is preferably formed as a slit 2d' extending into an axial direction of the portion 2c from lower end of the portion 2d for increasing the ease of molding of the shell 2. The slit 2d' is preferably positioned at the furthermost point away from the partition wall 3a so that the heat shielding skirt portion 2d is effective to restrict the fluid flowing in the tank 1 due to slanting of the vehicle.

It should be noted that the heat shielding portion may be provided with the lower shell.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A reservoir having a tank made of synthetic resin and a liquid level sensing device wherein said tank comprises upper and lower shells, said upper shell being formed integrally with a depending hollow tubular portion and one of said shells being formed integrally with a heat shielding skirt portion surrounding said tubular portion, said heat shielding skirt portion being extended into an interior of said lower shell for shielding said tubular portion against the heat applied in the heat welding of the connection of said upper and lower shells, and wherein said sensing device comprises a magnetically actuable switch means enclosed in said depending hollow tubular portion of said tank and a float member having a magnet axially slidable on said tubular portion for actuating said switch means when said magnet is in proximity to said switch means.

2. A reservoir according to claim 1 wherein said upper shell is formed with said heat shield skirt portion and said heat shield skirt portion is provided with passage means for establishing liquid level correspondence between the interior and the exterior of said heat shielding skirt portion.

3. A reservoir according to claim 1, wherein said heat shielding skirt portion is formed with a lower end opening and a slit extending in an axial direction of said tubular portion from the lower end of said heat shielding portion.

4. A reservoir according to claim 3, wherein said lower shell is formed with a partition wall effective to separate the interior of said tank into two liquid chambers when the liquid level falls below a predetermined level.

5. A reservoir according to claim 4, wherein said sensing device and said heat shielding skirt portion are arranged in one of said liquid chambers and said slit is formed in a part of said shielding skirt portion which is most distant from said partition wall.

* * * * *